United States Patent [19]

Elwell, Jr.

[11] 4,270,044
[45] May 26, 1981

[54] OPTICAL REFERENCE GYRO

[75] Inventor: John M. Elwell, Jr., Sudbury, Mass.

[73] Assignee: The Charles Stark Draper Laboratory, Inc., Cambridge, Mass.

[21] Appl. No.: 33,214

[22] Filed: Apr. 25, 1979

[51] Int. Cl.³ .............................................. G01J 1/20
[52] U.S. Cl. .................................... 250/201; 244/3.16
[58] Field of Search ............... 250/201, 202, 203, 216, 250/234; 356/141, 152, 248; 244/3.16, 3.17

[56] References Cited

U.S. PATENT DOCUMENTS

| | | |
|---|---|---|
| 2,719,470 | 10/1955 | Jensen . |
| 3,152,207 | 10/1964 | Emmerich . |
| 3,326,619 | 6/1967 | Johnson et al. . |
| 3,518,016 | 6/1970 | Burdin et al. . |
| 3,558,212 | 1/1971 | Ritchie . |
| 3,752,998 | 8/1973 | Stripling et al. . |
| 3,951,358 | 4/1976 | De Lano et al. .................. 244/3.16 |
| 4,027,540 | 6/1977 | Allard . |

Primary Examiner—David C. Nelms
Attorney, Agent, or Firm—Kenway & Jenney

[57] ABSTRACT

An inertially aided optical sensing system including an optical sensor, for example a telescope, and an optical reference gyro (ORG). The ORG emits a beam of collimated light aligned with the gyro's angular momentum vector. This light beam is directed into the optical sensor, e.g. a telescope, to create a bright spot, or "star", on the focal plane of the sensor. A closed loop control system adaptively controls the ORG, sensor or both in response to signals representative of the position of the beam incidence point in the focal plane in order to offset dynamic misalignments between an inertial reference system and the optical axis of the sensor arising from bending and internal frame deformations within the optical system.

22 Claims, 10 Drawing Figures

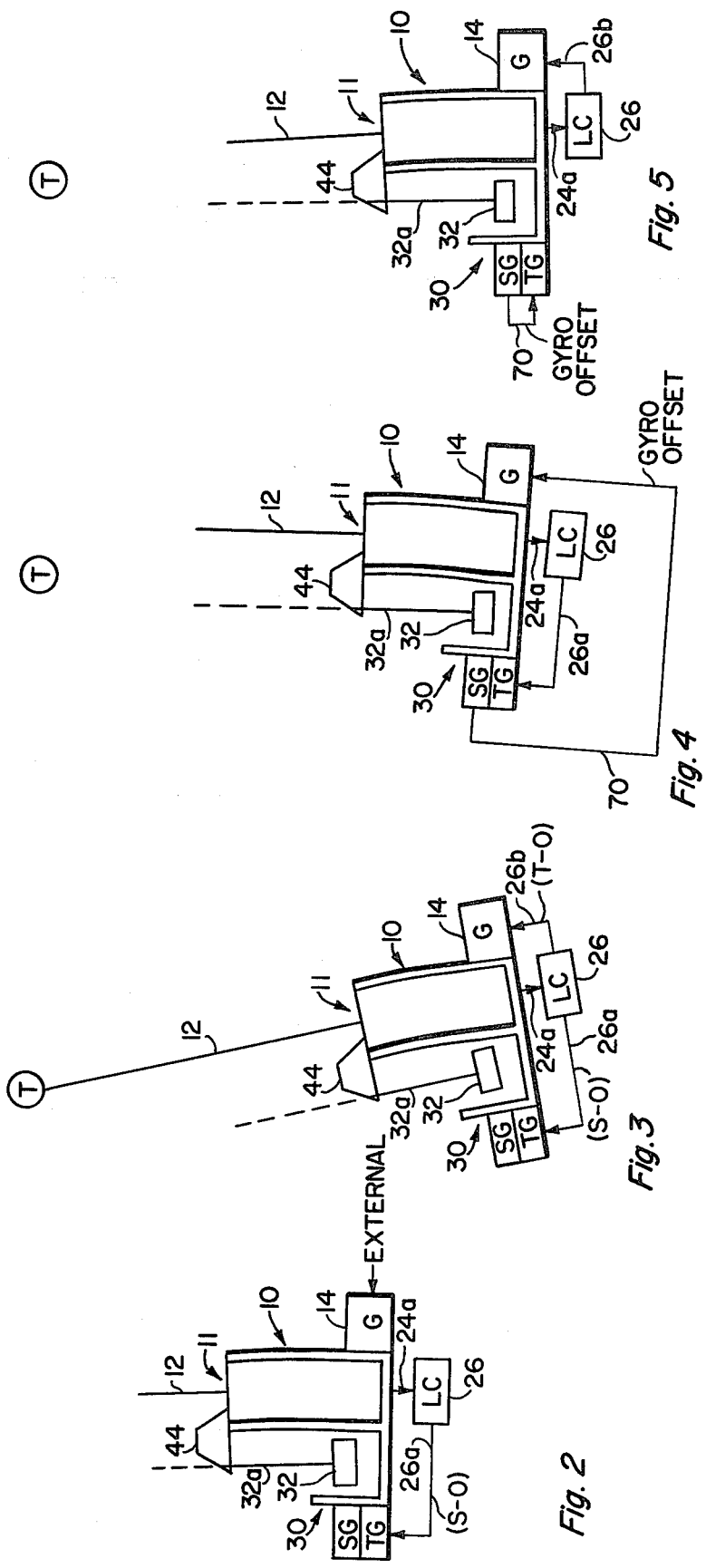

OPTICAL REFERENCE GYRO

BACKGROUND OF THE DISCLOSURE

The present invention relates generally to the field of optical observation and tracking and more particularly to inertially-aided optical observation and tracking systems.

The alignment stability which can be maintained between the inertial reference system and the optical system in an inertially-aided optical system is a critical performance limiting factor. Frame deformation internal to the optical sensor, e.g. a telescope, adds directly to system errors. Such deformation may result from thermal or motion effects from the sensor vehicle. In the prior art, methods for accommodating such deformation-induced error employed active alignment systems which optically detect deformation within the optical sensor and respond with positional changes or data manipulation in an attempt to correct for such deformations.

In the area of large observing telescopes and in high energy laser pointing tracking applications, the prior art devices are particularly sensitive to relative bending or misalignment of their elements with respect to the inertial reference frame. For example, the optical elements and associated support structures of very large observing telescopes deform when they are rotated with respect to the gravitational field. If this deformation cannot be detected and measured and then offset during a trajectory tracking operation, then motion is attributed to the target which in fact does not exist. In high energy laser trackers, similar problems exist.

In another area of the prior art, updating techniques used in vehicle-borne inertial measurement units (IMU's) employ a known surveyed point with a corner reflector and a laser tracker to measure the error attitude at the vehicle. Errors attributable to the tracker pointing and also to the mechanical and electrical interfaces between the tracker and IMU, pose service performance limitations.

Additionally in the prior art, for the problem of optically guided interceptor missiles one substantial error contributor has been the relative misalignment existing between the optical system and an inertial reference system. Generally in such systems, the target-to-be-intercepted is tracked by the optical system. However, that vehicle must be referred to a stable inertial reference frame for purposes of interceptor guidance. In tracking systems which employ an optical sensor, one problem in the prior art is obtaining high quality tracking data for a target with respect to inertial space. Such data can be obtained when the optical field which includes the target also includes a reference star (providing data representative of the relative difference in position between the target and the reference star position). In general, however, it is rare to find a convenient star in the sensor field of view that is suitable for use as a reference.

It is an object of the present invention to provide an apparatus for minimizing the relative misalignment between an optical system and an internal reference system.

Another object is to minimize the effect of optical sensor frame deformation in an inertially aided optical system.

SUMMARY OF THE INVENTION

Briefly, the present invention is a system including an optical sensor with an objective, or input end, for gathering light from an optical field, and a focal plane for forming an image of the optical field. The optical sensor may be adapted for rotational displacements about two orthogonal reference axes which are nominally mutually perpendicular to the optical axis of the sensor. Generally, the optical axis (or line-of-sight, LOS) of the optical sensor at the focal plane varies with time with respect to the optical axis at the objective due to deformations of the various internal structural or optical elements. Such deformation, for example, may arise due to vibration, temperature changes, or other environmental factors.

The system further includes an optical reference gyro (ORG). The ORG is a two degree-of-freedom gyro having its case attached to the optical sensor with its spin axis nominally aligned with the sensor LOS. The ORG includes a wheel (or rotor) adapted for continuous rotation about a spin axis and for rotational displacement about two input axes. The ORG spin axis and two input axes are mutually perpendicular and intersect at a common point. A wheel motor drives the wheel to continuously rotate about the spin axis. The ORG also includes torquers which are responsive to applied signals to torque the rotor about the ORG input axes. In addition, the ORG includes a light source which is associated with the wheel and is adapted to provide a collimated light beam emanating from the wheel along the ORG spin axis.

A beam coupling device, such as a truncated corner reflector, is connected to the objective of the optical sensor so that the collimated light beam propagating along the gyro spin axis is coupled into the optical sensor at the objective. An optical detector is adapted to detect the point of incidence of the collimated beam, as well as targets in the scene, on the sensor focal plane, and to subsequently generate position signals (which are representative of the position of the beam and targets in the focal plane).

In one form of the invention, a feedback network operates in a closed loop manner to apply the beam position signals to the torquers associated with the ORG, so that the spin axis of the ORG is adaptively re-positioned to maintain the incident point of the beam to be fixed in the focal plane regardless of the frame deformation state of various elements of the optical sensor. In this form, the spin axis of the ORG is at all times substantially aligned with the optical axis of the optical sensor. In this form, an additional gyro (i.e. a "roll" gyro) may be firmly affixed to the ORG case, with the roll gyro having its input axis substantially aligned with the LOS or vehicle roll axis. Conventional strapdown computations may be performed on the torquing signals from the ORG and the roll gyro to generate signals representative of the inertial location of the beam incident point on the focal plane at all times. Conventional gyro pick-offs may be used to generate signals representative of the angular position of the ORG spin axis with respect to its case, which in turn allows signals from the roll gyro to be employed in the above computational process. In a tracking configuration, the position of a target can be determined by computations relating the target to the ORG spin axis. In a variation of this form, the sensor LOS may be aligned with the target by driving gimbals associated with the sensor by signals representative of the target position in the focal plane.

In another form of the present invention, a feedback network operates in a closed loop manner to apply the beam position signals to gimbal drive motors associated with the sensor (to drive the sensor so that the sensor is directed to continuously receive the collimated beam at its objective) and at the same time apply conventionally derived wheel position signals to the torquers to maintain the ORG spin axis fixed with respect to its case. In this latter form of the invention, the incident point of collimated beam appears as an "artificial star" in the focal plane as viewed by the optical sensor. The alignment between the ORG spin axis and the sensor optical axis (at the input end) may change, or various internal elements of the optical sensor may change with respect to each other without modifying the relationship which exists between the artificially created star on the focal plane and the remainder of the inertial scene on the focal plane. In a tracking configuration which includes a roll gyro having its input axis aligned with the sensor roll axis, the position of a target with respect to the artificially created star can be determined by computations based on the relative target position with respect to the known "artificial star" position. This relative position can then be converted to absolute form by computations based on the torquing signals which position the ORG spin axis.

Additional forms of the invention can include features of the above described forms. Thus, with the present invention, frame deformation of the optical elements and their supporting structure may be offset in observing telescopes, as well as high energy laser trackers, as well as other optical systems. In addition, the performance of vehicle-borne optically updated IMU's can be substantially improved by referencing the coordinate system to the tracker focal plane using the present invention to establish an "artificial star" in the focal plane. With both the update point and the inertial reference system on the focal plane, relative tracking and alignment errors are substantially eliminated.

BRIEF DESCRIPTION OF THE DRAWINGS

The foregoing and other objects of this invention, the various features thereof, as well as the invention itself, may be more fully understood from the following description, when read together with the accompanying drawings in which:

FIGS. 2–5 show partially in section and partially in block diagram form, alternative embodiments of the present invention;

FIGS. 6–9 illustrate exemplary focal plane images for the embodiments of FIGS. 2–5, respectively.

DESCRIPTION OF THE PREFERRED EMBODIMENT

Figure 1:
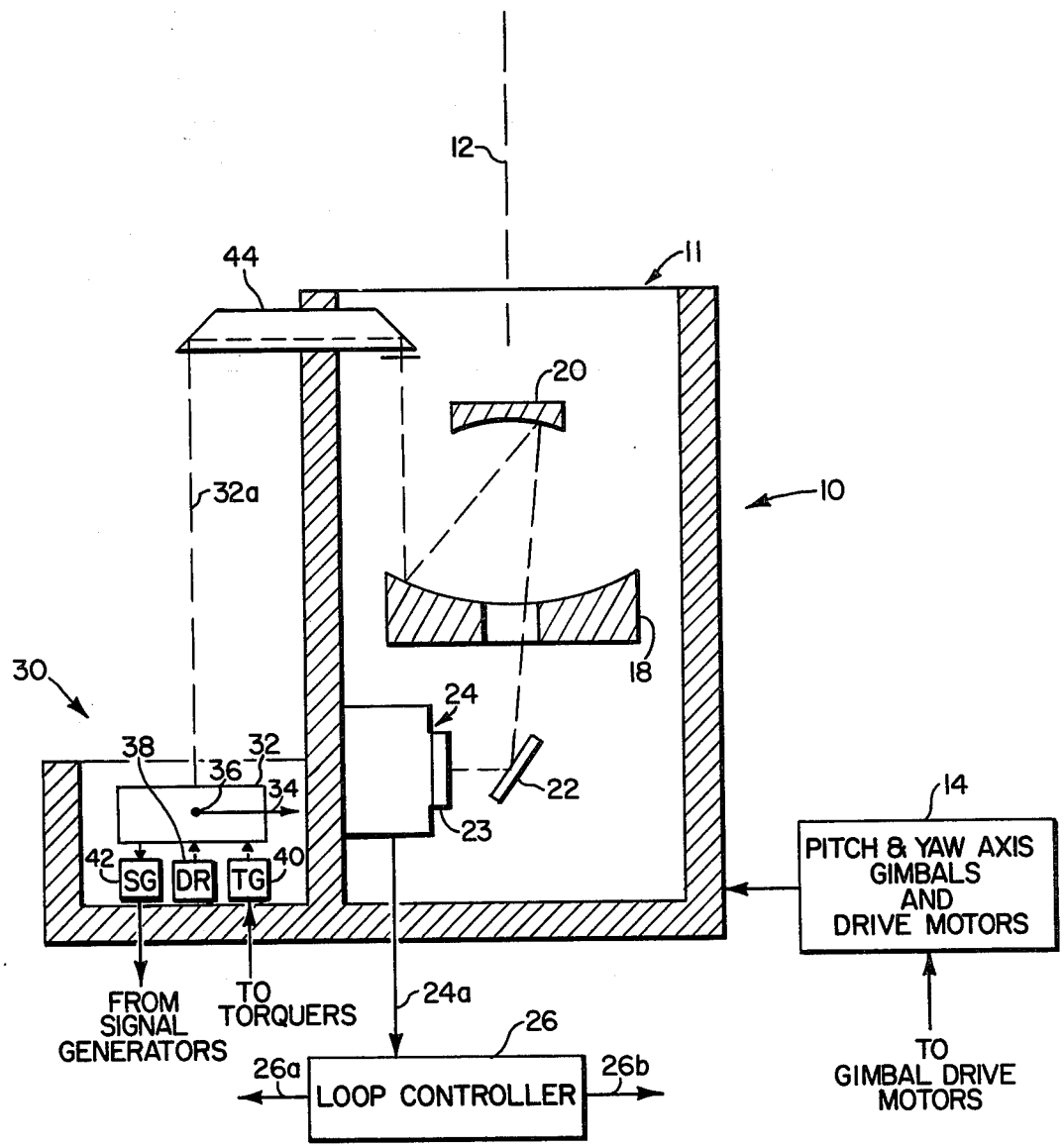
FIG. 1 shows, partially in section and partially in block diagram form, an embodiment of the present invention.

FIG. 1 shows a general form of the preferred embodiment of the present invention. In that embodiment, a sensor, or telescope, 10 is directed with its objective 11 directed to a scene (or optical field) along a line of sight (LOS) 12. Sensor 10 includes gimbals and associated conventional gimbal drive motors 14 for controlling rotational displacements of sensor 10 about orthogonal pitch and yaw axes which are nominally perpendicular to the LOS 12.

The illustrated sensor 10 is typical, but may have alternative forms. As shown, sensor 10 includes mirrors 18 and 20, each having associated support structures (not shown). In addition, the sensor 10 utilizes a conventional scanning technique implemented by mirror assembly 22 which successively directs portions of the image produced by sensor 10 on the focal plane 23. Elemental portions of the focal plane are coupled to an optical detector assembly 24. The scanning mirror 22 assembly and optical detector assembly 24 which is conventionally arranged so that the assembly 24 produces output signals on line 24a representative of sampled portions of the focal plane image of the sensor 10. The focal plane image contains information concerning the orientation of both the ORG spin axis and other objects, such as targets, in the scene observed by the telescope. Signal lines 24a are connected to a feedback loop controller 26 having output lines 26a and 26b.

The embodiment of FIG. 1 also includes an optical reference gyro (ORG) assembly 30. ORG 30 includes a conventional two degree-of-freedom gyro having a rotor (or wheel) 32 adapted for continuous rotary motion about a spin axis 32a and for rotational displacement about a first input axis 34 and a second input axis (not shown). By way of example, the gyro may be a dry tuned gyro or a spherical gas bearing gyro. The two input axes and spin axis 32a are mutually perpendicular and intersect at a common point 36. A wheel driver (DR) 38 continuously drives wheel 32 about axis 32a in a conventional fashion. ORG 30 also includes conventional torquers (TG) 40 for applying torques to wheel 32 about the input axes, and a conventional signal generator (SG) 42 for generating signals representative of the angular displacements of wheel 32 about the input axes and with respect to the case.

ORG 30 also includes a means (not shown) for generating a collimated light beam coaxial with the spin axis of the wheel of the gyro. By way of example, the collimated light beam may be generated by an LED light source and an associated plano-convex converging lens assembly on the wheel 32. Alternatively, the beam may be generated by a light source affixed to the ORG housing and a through-the-wheel pinhole and lens assembly integral to the wheel 32.

A corner reflector 44 is coupled to the input end, or objective, 11 of sensor 10. Reflector 44 is adapted to receive the collimated light beam from the wheel 32 and reflect that beam into and through the optical system 10 by way of mirrors 18, 20 and 22 to the focal plane 23 and detector assembly 24.

In the present embodiment, the housing for ORG 30 is coupled to the base of the sensor 10 such that the two input axes of ORG 30 are nominally aligned with the pitch and yaw axes of the sensor 10.

In one form of the illustrated embodiment, the gimbals of sensor 10 are driven by externally generated signals to nominally aim the sensor 10. The loop controller 26 produces ORG control signals on line 26a representative of the detected difference in position of the point of incidence of the collimated beam in the focal plane from a reference point in the focal plane. These ORG control signals are in turn applied to the input lines of the torquers of ORG 30 in a closed loop manner so that the control signals are nulled, with the overall result that the wheel 32 is continually torqued to correct the position of its spin axis. With this configuration, the beam incidence point in the focal plane is maintained substantially at the reference point in the focal plane, for example, the origin of a coordinate system reference to that focal plane. The collimated beam passes through the same path as the light from the scene viewed by the optical sensor 10 and therefore, by closing the loop on the ORG 30 by way of the optical elements in sensor 10, the spin axis of ORG 30 is maintained substantially parallel to the line of sight (LOS 12).

In a variation of the illustrated form of the invention, a roll gyro may be configured with its input axis parallel to the roll axis of the ORG case. The output signals from this roll gyro may be used in conjunction with the signals applied to torquer 40 in a conventional manner to compute the inertial location of the "artificial star" as viewed at the focal plane. The signal generator 42 may then be used with ORG 30 to generate signals representative of the spin axis offset, with respect to the ORG state.

Summarizing, the ORG 30 emits a collimated beam which is aligned with the angular momentum vector of the wheel of ORG 30. The collimated beam is directed into the optical sensor at the objective 11 by means of a corner reflector 44. The beam creates a bright spot, or artificial star, at the point of incidence in the focal plane of the sensor 10. The loop controller 26 provides an automatic control system which adaptively controls the ORG 30 to position the beam incidence point at a fixed reference location in the optical sensor field. With the beam incidence point so positioned, the ORG spin axis and LOS 12 are parallel, and the angular position of ORG 30 may be determined conventionally to provide an indication of the angular position of the effective line of sight of sensor 10.

In the alternative configuration described above, the ORG 30 is in effect strapped down to a target-to-be-viewed in the scene presented to the sensor 10. In that configuration, the sensor 10 may be positioned by the gimbal drive motors to maintain the desired target in the field of view, while the ORG is adapted to maintain the beam point of incidence aligned with the target image in the focal plane. By nulling and measuring the focal plane distance between the target image and the beam incidence point, a measure of the distance of the target from the artificial star base can be obtained. By using the gyro torquer signal, the absolute position of the artificial star may be readily computed. In this latter configuration, the signals from the roll gyro are incorporated using conventional techniques in conjunction with the torquer signals for ORG 30 to compute the absolute position of the artificial star.

In the configuration of FIG. 1, there are three sensor signals and two actuator commands which may be used to form a servo system in accordance with the present invention. These sensor signals and actuator commands are listed in the following table:

TABLE

| Sensor Signals | Actuator Commands |
| --- | --- |
| target track error (T-O) | gimbal drive signal |
| artificial star track error (S-O) | ORG torquer drive signal |
| ORG wheel offset (gyro offset) | |

Each actuator command can be generated from combinations of the sensor signals. The gimbal drive signals, for example, can be generated from any of the three sensor signals, or from any of the three combinations of two sensor signals, or from all three sensor signals. Thus, there are seven different servo configurations for generating gimbal drive signals. Similarly, there are seven different combinations by which the ORG torquer drive signals may be generated. Therefore, there are forty-nine different servo configurations for the overall system of the present invention.

FIGS. 2–5 show four embodiments of the present invention wherein elements corresponding to similar elements in FIG. 1 are denoted by identical reference designations. In FIGS. 2–5, the housing of optical sensor 10 is shown with a bend (representative of an exemplary structural deformation) between the objective 11 and the opposite end of the sensor. The optical elements in the sensor 10 (not shown in FIGS. 2–5) may be of the form shown in FIG. 1, or another conventional form. The gimbals and associated drive motors 14 are represented by the reference designation G, the loop controller 26 by the designation LC, the torquers 40 by the reference designation TG, and the ORG pickoffs, or signal generator, 42 by the designation SG. FIGS. 6–9 show the focal plane image for the configuration of FIGS. 2–5, respectively, with respect to orthogonal coordinate axes 60 and 62 referenced to the focal plane and having a point of intersection represented by coordinates "0".

In the configuration of FIG. 2, the loop controller 26 provides resolved signals on line 26a which are representative of the focal plane distance between the point of incidence (at focal plane coordinates S) of the beam (i.e. the "artificial star") and the intersection of axes 60 and 62 (i.e. point 0 which is fixed in the focal plane). These signals (S-O) on line 26a are applied to the torquers in a closed loop manner so that the focal plane distance between S and 0 is nulled. When nulled, the spin axis of wheel 32 is parallel with the line of sight 12 of the sensor 10 and the focal plane image has the form shown in FIG. 6 where dot 64 is representative of the incident point of the beam in the focal plane. The signal generator SG provides signal representative to correction of the line of sight of the sensor 10 (relative to the nominal line of sight of sensor 10 established by the gimbals and associated drive motors 28) required due to the deformation between the input end 11 and the focal plane. In this configuration, externally generated signals may drive gimbals 14 to direct the sensor 10 as desired.

FIGS. 3–5 show a configuration for tracking a target (denoted by the encircled designation T). In the configuration of FIG. 3, the loop controller 26 generates a set of resolved signals on line 26a which are similar to those in FIG. 2 (i.e. S-O). In addition, loop controller 26 generates a set of resolved signals (T-0) on line 26b which are representative of the focal plane distance between the image of the target T and the intersection of axes 60 and 62. The signals on lines 26a are applied to the ORG torquers and the signals on lines 26b are applied to the drive motors associated with gimbals 24 in a closed loop manner so that both the signals (S-0) and (T-0) are nulled. When nulled, the spin axis of wheel 32 is parallel with the line of sight of sensor 10, which in turn aimed directly at the target T. Under these conditions, the focal plane image has the form shown in FIG. 7 where the dot 64 (representing the beam incidence point) is superimposed on the target image "T" at the intersection of axes 60 and 62.

FIG. 4 shows a space integrator tracking configuration, where loop controller 26 provides resolved signals (T–S) on line 26a which are representative of the focal plane distance between the target and the beam incidence point. The signals on line 26a are applied to the ORG torquers so that (T–S) is nulled in a closed loop manner. In addition, the signal generator SG provides resolved gyro offset signals on line 70 representative of the offset of wheel 32 relative to the ORG housing. The signals on line 70 are applied to the sensor gimbal drive motors so that the gyro offset is nulled in a closed loop manner. The rotor 32 integrates the ORG torque (rate) commands and maintains an accurate inertial angular reference, i.e. an "artificial star" in the focal plane. The ORG pickoffs in the signal generator drive the sensor gimbals to minimize stabilization errors. With this configuration, any ORG stabilization error is common mode error which is removed by differencing the T and S signals. In effect, the ORG is "strapped down" to the target and acts as another set of isolation gimbals. With this configuration, the sensor is rotationally displaced about its pitch and yaw axes so that the target and the beam incident point are superimposed in the focal plane, as shown in FIG. 8.

FIG. 5 shows a rate gyro tracking configuration where the loop controller 26 provides the same gyro offset signals as the embodiment of FIG. 4. In the embodiment of FIG. 5, however, the gyro offset signals are applied to the ORG torquers by way of line 70 to null those offset signals. In addition, loop controller 26 applies resolved signals via line 26b to the sensor gimbal drive motors to null those signals. In this configuration, the ORG torquing command is proportional to the inertial rate. When the resolved signals are representative of (T–S), and the (T–S) signals are nulled, the sensor is rotationally displaced about its pitch and yaw axes so that the beam incident point and the target image are superimposed in the focal plane, as shown in FIG. 9.

The loop controller 26 in FIG. 5 may be alternatively configured to provide (T–O) signals by way of line 26b to the sensor gimbal drive motors. With this configuration, the (T–O) signals are nulled, and the sensor is rotationally displaced about its pitch and yaw axes so that the target image T in the focal plane is fixed at the point of intersection of axes 60 and 62, while the beam incidence point or artificial start 64 appears to move relative to the target.

In yet another alternative configuration, the loop controller 26 in FIG. 5 may be configured to provide (S–O) signals by way of line 26b to the sensor gimbal drive motors. With this configuration, the (S–O) signals are nulled, and the sensor is rotationally displaced about its pitch and yaw axes so that the artificial star 64 is fixed at the point of intersection of axes 60 and 62, while the target image T in the focal plane appears to move relative to the star.

In a similar manner, the FIG. 4 configuration may be adapted to fix either the target image or the artificial star in the focal plane by arranging the loop controller to provide (T–O) or (S–O) signals respectively on line 26a. With these configurations, the ORG rotor is torqued (and rotationally displaced about the ORG input axes) to null the signals on line 26a, at which time the above-described focal plane conditions are met.

Figure 10:
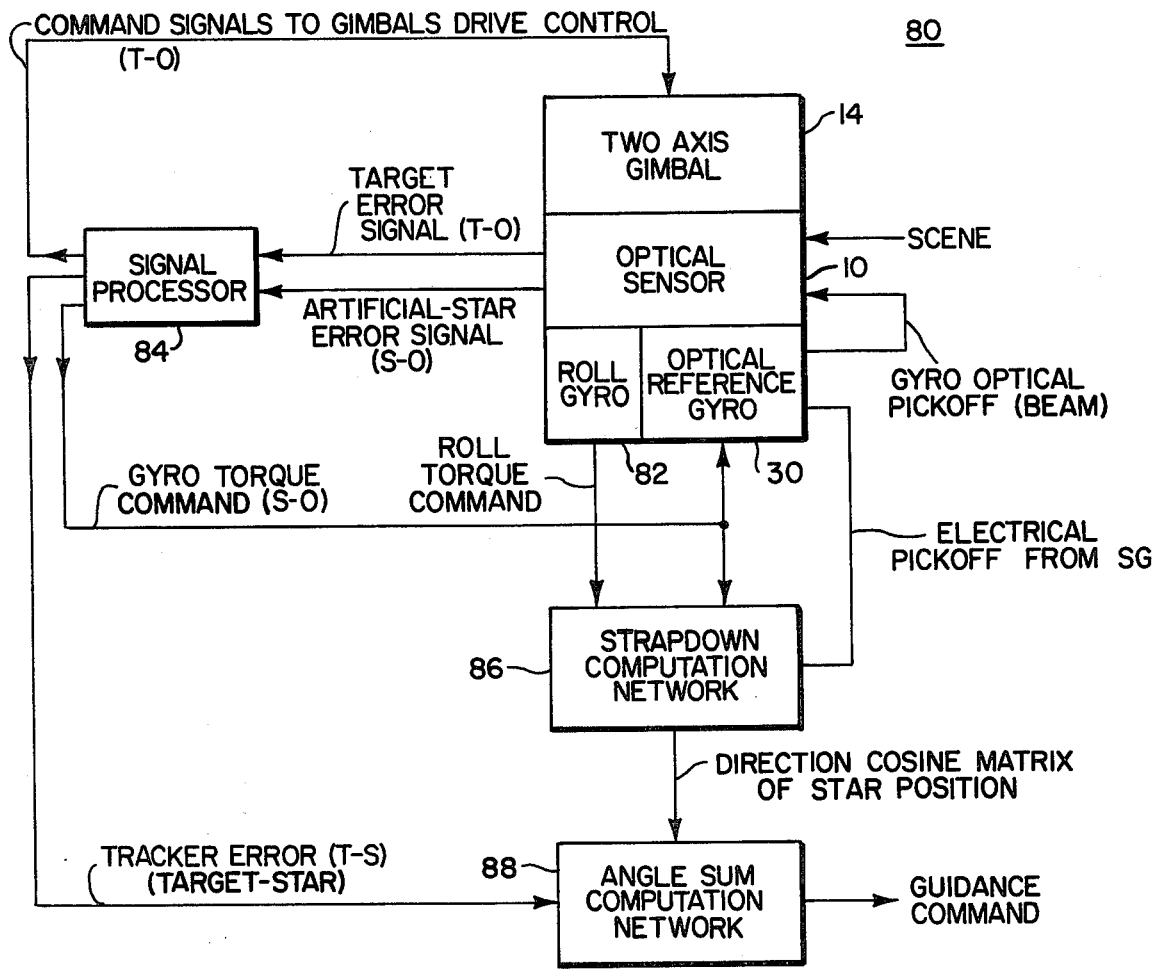
FIG. 10 shows, in block diagram form, an embodiment of the present invention in a guidance system adaptation.

In all of the above configurations, a conventional single degree of freedom (SDOF) roll gyro may be added with its input axis parallel to the roll axis of the ORG. FIG. 10 shows an exemplary guidance system 80 for a target interceptor which is based on the configuration of FIG. 3 as modified to include a roll gyro 82, signal processor 84, strapdown computation network 86 and angle sum network 88. In FIG. 10, elements having corresponding elements in FIG. 3 are identified with the same reference numerals. The system 80 maintains the artificial star at the center of the focal plane so that the inertial axis and sensor axis are coincident and roll about these axes does not effect the artificial star position. The alignment is maintained within the bandwidth of the system, eliminating typically large amplitude, low frequency bias effects.

In FIG. 10, the loop controller includes the portion of sensor 10 which generates the (T–O) and (S–O) signals and converts those signals to gimbal commands and gyro torquer commands. The network 86 uses the roll gyro output signal and (S–O) command signal in conjunction with the SG signal in a conventional manner to generate a direction cosine matrix of the artificial star position. The network 88 uses the direction cosine matrix together with the tracker error (T–S) signal in a conventional manner to generate guidance command signals for intercepting the target. In this system, the rotor of ORG 30 is directly coupled to the focal plane of sensor 10 by closing the control loop through the optical system, eliminating errors due to dynamic misalignment between the ORG input axis and the sensor input axis.

In alternative strapdown systems, the FIG. 4 (or FIG. 5) configurations may be used with an SDOF roll gyro where a (T–S) signal is used to torque the gyro or a (T–O) signal is used to torque the gyro. In the latter system, the inertial system is strapped down to the target.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An inertially-aided optical system on a support platform, comprising:
   A. an optical sensor coupled to said platform and including a focal plane, an objective for gathering light from an optical field about an optical axis, and associated optical elements adapted to form an image of said optical field on said focal plane,
   B. an optical reference gyro (ORG) rigidly coupled to said sensor and including:
      wheel means adapted for continuous rotation about a spin axis and for rotational displacement about two orthogonal input axes, said input axes being fixed with respect to said sensor and said input axes and said spin axis having a common point of intersection,
      means for driving said wheel means to continuously rotate about said spin axis,
      torquer means coupled to said sensor for applying torques to said wheel means about said input axes in response to drive signals applied thereto,
      optical source means coupled to said wheel means for generating a collimated optical beam directed along said spin axis from said wheel means, C. beam coupling means for coupling said optical beam through said objective of said optical sensor to said focal plane, D. optical detector means for detecting the point of incidence of said optical beam on said focal plane and for generating beam position signals, said beam position signals being representative of the position of said point of incidence in said focal plane, and E. feedback means responsive to said beam position signals to control the position of said beam incidence point in said focal plane.

2. A system according to claim 1 wherein said feedback means includes means for generating S-O drive signals, said S-O drive signals being representative of the displacement of said beam incidence point with respect to a reference point in said focal plane, and for applying said S-O drive signals to said torquer means to null said S-O drive signals.

3. A system according to claim 2 further comprising a computing means responsive to said S-O drive signals to generate signals representative of the direction of said optical axis relative to said platform.

4. A system according to claim 1 wherein said sensor is adapted for rotational displacement about orthogonal pitch and yaw axes, said pitch and yaw axes and said optical axis mutually orthogonal having a common point of intersection, and said sensor further includes gimbal drive means responsive to gimbal drive signals to rotationally displace said sensor about said pitch and yaw axes.

5. A system according to claim 4
wherein said ORG further includes means for generating gyro offset drive signals representative of the rotational displacement of said wheel means about said input axes, and wherein said feedback means includes means for generating S-O drive signals, said S-O drive signals being representative of the displacement of said beam incidence point and a reference point in said focal plane, and for applying said S-O drive signals to said gimbal drive means to null said S-O drive signals, and wherein said feedback means includes means for applying said gyro offset drive signals to said torquer means to null said gyro offset signals.

6. A system according to claim 5 further comprising a computing means responsive to said S-O drive signals to generate signals representative of the direction of said optical axis relative to said platform.

7. A system according to claim 4 wherein said optical detector means further includes means for detecting the image of a target in said focal plane and includes means for generating target position signals, said target position signals being representative of the position of said target image in said focal plane, and wherein said feedback means includes means responsive to said beam position signals and said target position signals for generating S-O drive signals, said S-O drive signals being representative of the displacement of said beam incidence point with respect to a reference point in said focal plane, wherein said feedback means includes means responsive to said beam position signals and said target position signals for generating T-O drive signals, said T-O drive signals being representative of the displacement of a target image with respect to a reference point in said focal plane, and wherein said feedback means further includes means for applying said S-O drive signals to said torquer means to null said S-O drive signals, and for applying said T-O drive signals to said gimbal drive means to null said T-O drive signals.

8. A system according to claim 4 wherein said optical detector means further includes means for detecting the image of a target in said focal plane and includes means for generating target position signals, said target position signals being representative of the position of said target image in said focal plane, wherein said ORG further includes means for generating gyro offset drive signals representative of the rotational displacement of said wheel means about said input axes, and wherein said feedback means includes means responsive to said beam position signals and said target position signals for generating S-O drive signals, said S-O drive signals being representative of the displacement of said beam incidence point with respect to a reference point in said focal plane, wherein said feedback means further includes means for applying said S-O drive signals to said torquer means to null said S-O drive signals, and for applying said gyro offset drive signals to said gimbal drive means to null said gyro offset drive signals.

9. A system according to claim 4 wherein said optical detector means further includes means for detecting the image of a target in said focal plane and includes means for generating target position signals, said target position signals being representative of the position of said target image in said focal plane, wherein said ORG further includes means for generating gyro offset drive signals representative of the rotational displacement of said wheel means about said input axes, and wherein said feedback means includes means responsive to said beam position signals and said target position signals for generating T-O drive signals, said T-O drive signals being representative of the displacement of said beam incidence point with respect to a reference point in said focal plane, wherein said feedback means further includes means for applying said T-O drive signals to said torquer means to null said T-O drive signals, and for applying said gyro offset drive signals to said gimbal drive means to null said gyro offset drive signals.

10. A system according to claim 4 wherein said optical detector means further includes means for detecting the image of a target in said focal plane and includes means for generating target position signals, said target position signals being representative of the position of said target image in said focal plane, wherein said ORG further includes means for generating gyro offset drive signals representative of the rotational displacement of said wheel means about said input axes, and wherein said feedback means includes means responsive to said beam position signals and said target position signals for generating T-S drive signals, said T-S drive signals being representative of the displacement of said beam incidence point with respect to a reference point in said focal plane, wherein said feedback means further includes means for applying said T-S drive signals to said torquer means to null said T-S drive signals, and for applying said gyro offset drive signals to said gimbal drive means to null said gyro offset drive signals.

11. A system according to claim 4 wherein said optical detector means further includes means for detecting the image of a target in said focal plane and includes means for generating target position signals, said target position signals being representative of the position of said target image in said focal plane, and wherein said ORG further includes means for generating gyro offset drive signals representative of the rotational displacement of said wheel means about said input axes, and wherein said feedback means includes means responsive to said beam position signals and said target position signals for generating S-O drive signals, said S-O drive signals being representative of the displacement of said beam incidence point with respect to a reference point in said focal plane, and wherein said feedback means further includes means for applying said gyro offset drive signals to said torquer means to null said gyro offset signals, and for applying said S-O drive signals to said gimbal drive means to null said S-O drive signals.

12. A system according to claim 4 wherein said optical detector means further includes means for detecting the image of a target in said focal plane and includes means for generating target position signals, said target position signals being representative of the position of said target image in said focal plane, and wherein said ORG further includes means for generating gyro offset drive signals representative of the rotational displacement of said wheel means about said input axes, and wherein said feedback means includes means responsive to said beam position signals and said target position signals for generating T-O drive signals, said T-O drive signals being representative of the displacement of said beam incidence point with respect to a reference point in said focal plane, and wherein said feedback means further includes means for applying said gyro offset drive signals to said torquer means to null said gyro offset signals, and for applying said T-O drive signals to said gimbal drive means to null said T-O drive signals.

13. A system according to claim 4 wherein said optical detector means further includes means for detecting the image of a target in said focal plane and includes means for generating target position signals, said target position signals being representative of the position of said target image in said focal plane, and wherein said ORG further includes means for generating gyro offset drive signals representative of the rotational displacement of said wheel means about said input axes, and wherein said feedback means includes means responsive to said beam position signals and said target position signals for generating T-S drive signals, said T-S drive signals being representative of the displacement of said beam incidence point with respect to a reference point in said focal plane, and wherein said feedback means further includes means for applying said gyro offset drive signals to said torquer means to null said gyro offset signals, and for applying said T-S drive signals to said gimbal drive means to null said T-S drive signals.

14. A system according to claim 7 further comprising a single degree-of-freedom roll gyro coupled to said sensor and having a roll gyro input axis substantially parallel to said optical axis, said roll gyro including means to generate a roll signal representative of the rate of angular displacement of said roll gyro about said roll gyro input axis.

15. A system according to claim 8 further comprising a single degree-of-freedom roll gyro coupled to said sensor and having a roll gyro input axis substantially parallel to said optical axis, said roll gyro including means to generate a roll signal representative of the rate of angular displacement of said roll gyro about said roll gyro input axis.

16. A system according to claim 9 further comprising a single degree-of-freedom roll gyro coupled to said sensor and having a roll gyro input axis substantially parallel to said optical axis, said roll gyro including means to generate a roll signal representative of the rate of angular displacement of said roll gyro about said roll gyro input axis.

17. A system according to claim 10 further comprising a single degree-of-freedom roll gyro coupled to said sensor and having a roll gyro input axis substantially parallel to said optical axis, said roll gyro including means to generate a roll signal representative of the rate of angular displacement of said roll gyro about said roll gyro input axis.

18. A system according to claim 11 further comprising a single degree-of-freedom roll gyro coupled to said sensor and having a roll gyro input axis substantially parallel to said optical axis, said roll gyro including means to generate a roll signal representative of the rate of angular displacement of said roll gyro about said roll gyro input axis.

19. A system according to claim 12 further comprising a single degree-of-freedom roll gyro coupled to said sensor and having a roll gyro input axis substantially parallel to said optical axis, said roll gyro including means to generate a roll signal representative of the rate of angular displacement of said roll gyro about said roll gyro input axis.

20. A system according to claim 13 further comprising a single degree-of-freedom roll gyro coupled to said sensor and having a roll gyro input axis substantially parallel to said optical axis, said roll gyro including means to generate a roll signal representative of the rate of angular displacement of said roll gyro about said roll gyro input axis.

21. Apparatus according to claim 1 wherein said beam coupling means is a means for receiving said optical beam along a first axis and for transmitting said received beam in the opposite direction along a second axis, said second axis being parallel to and laterally displaced from said first axis.

22. Apparatus according to claim 21 wherein said coupling means is a truncated corner reflector.

* * * * *